(12) United States Patent
Dasbach

(10) Patent No.: US 6,772,933 B2
(45) Date of Patent: Aug. 10, 2004

(54) WELDING SHIELD SYSTEM

(75) Inventor: Gerald L. Dasbach, 19814 Holly Walk Lane Ct., Spring, TX (US) 77388

(73) Assignee: Gerald L. Dasbach, Spring, TX (US)

( * ) Notice: Subject to any disclaimer, the term of this patent is extended or adjusted under 35 U.S.C. 154(b) by 0 days.

(21) Appl. No.: 10/281,451

(22) Filed: Oct. 24, 2002

(65) Prior Publication Data

US 2004/0079732 A1 Apr. 29, 2004

(51) Int. Cl.[7] .............................. B23K 9/32; B23K 37/00
(52) U.S. Cl. ........................................ 228/59; 219/136
(58) Field of Search ..................... 219/136.74; 228/59

(56) References Cited

U.S. PATENT DOCUMENTS

| | | | | |
|---|---|---|---|---|
| 1,711,151 A | * | 4/1929 | Lincoln | 219/74 |
| 1,717,530 A | * | 6/1929 | Thomson | 219/74 |
| 1,746,191 A | * | 2/1930 | Devers | 219/74 |
| 1,981,850 A | * | 11/1934 | Fisher | 228/173.2 |
| 2,123,612 A | | 7/1938 | Obert | 432/225 |
| 2,410,306 A | | 10/1946 | Romberg | 52/82 |
| 2,553,899 A | | 5/1951 | Dempsey | 228/57 |
| 3,515,844 A | * | 6/1970 | Colarossi et al. | 219/124.22 |
| 3,688,070 A | * | 8/1972 | Smith | 219/60 A |
| 4,005,305 A | * | 1/1977 | Nelson et al. | 219/72 |
| 4,944,444 A | | 7/1990 | Renner | 228/59 |

* cited by examiner

Primary Examiner—Kiley Stoner
Assistant Examiner—Kevin P. Kerns

(57) ABSTRACT

A welding shield system for reducing air movement about a welding area thereby allowing gas metal arc welding to be utilized in high air flow environments. The welding shield system includes a main body having an upper opening, a plurality of arm members extending from the main body, and a securing device attached to each of the arm members. The main body is positionable over the welding area thereby deflecting air flow thereto while allowing the welding gun to be inserted through the upper opening.

13 Claims, 5 Drawing Sheets

WELDING SHIELD SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to gas metal arc welding systems and more specifically it relates to a welding shield system for reducing air movement about a welding area thereby allowing gas metal arc welding to be utilized in high air flow environments.

2. Description of the Related Art

Gas metal arc welding (GMAW), also called metal inert gas welding (MIGW), shields the weld zone with an external gas such as argon, helium, carbon dioxide, or gas mixtures. Deoxidizers present in the electrode can completely prevent oxidation in the weld puddle, making multiple weld layers possible at the joint. GMAW is a relatively simple, versatile, and economical welding system to use. GMAW increases productivity of workers significantly compared to stick metal arc welding (SMAW). In addition, the temperatures involved in GMAW are relatively low and are therefore suitable for thin sheet and sections less than ¼ inch.

The main problem with GMAW is that it cannot be utilized within windy environments or locations where air flow is relatively significant because the shielding gas is blown away. A further problem with GMAW is that in high air flow conditions the resulting weld may have flaws and be weakened. Another problem with GMAW is that workers often times must revert back to utilizing SMAW in high air flow environments.

Examples of patented devices which may be related to the present invention include U.S. Pat. No. 2,553,899 to O. E. Dempsey; U.S. Pat. No. 2,123,612 to C. W. Obert; U.S. Pat. No. 2,410,306 to R. A. Romberg; and U.S. Pat. No. 4,944,444 to Renner.

While these devices may be suitable for the particular purpose to which they address, they are not as suitable for reducing air movement about a welding area thereby allowing gas metal arc welding to be utilized in high air flow environments. Conventional GMAW processes do not allow for the usage of GMAW within high air flow environments.

In these respects, the welding shield system according to the present invention substantially departs from the conventional concepts and designs of the prior art, and in so doing provides an apparatus primarily developed for the purpose of reducing air movement about a welding area thereby allowing gas metal arc welding to be utilized in high air flow environments.

BRIEF SUMMARY OF THE INVENTION

In view of the foregoing disadvantages inherent in the known types of welding systems now present in the prior art, the present invention provides a new welding shield system construction wherein the same can be utilized for reducing air movement about a welding area thereby allowing gas metal arc welding to be utilized in high air flow environments.

The general purpose of the present invention, which will be described subsequently in greater detail, is to provide a new welding shield system that has many of the advantages of the welding systems mentioned heretofore and many novel features that result in a new welding shield system which is not anticipated, rendered obvious, suggested, or even implied by any of the prior art welding systems, either alone or in any combination thereof.

To attain this, the present invention generally comprises a main body having an upper opening, a plurality of arm members extending from the main body, and a securing device attached to each of the arm members. The main body is positionable over the welding area thereby deflecting air flow thereto while allowing the welding gun to be inserted through the upper opening.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a welding shield system that will overcome the shortcomings of the prior art devices.

A second object is to provide a welding shield system for reducing air movement about a welding area thereby allowing gas metal arc welding to be utilized in high air flow environments.

Another object is to provide a welding shield system that increases the efficiency and productivity of a welding operation.

An additional object is to provide a welding shield system that may be utilized indoors or outdoors.

A further object is to provide a welding shield system that may be utilized upon various types of structures to be welded.

Another object is to provide a welding shield system that may be easily attached and removed from a welding area.

A further object is to provide a welding shield system that improves the quality of a weld using GMAW in high air movement areas.

A further object is to provide a welding shield system that may be attached to horizontal, vertical, inverted or angled surfaces.

Another object is to provide a welding shield that may be attached to either ferrous or non-ferrous metals.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
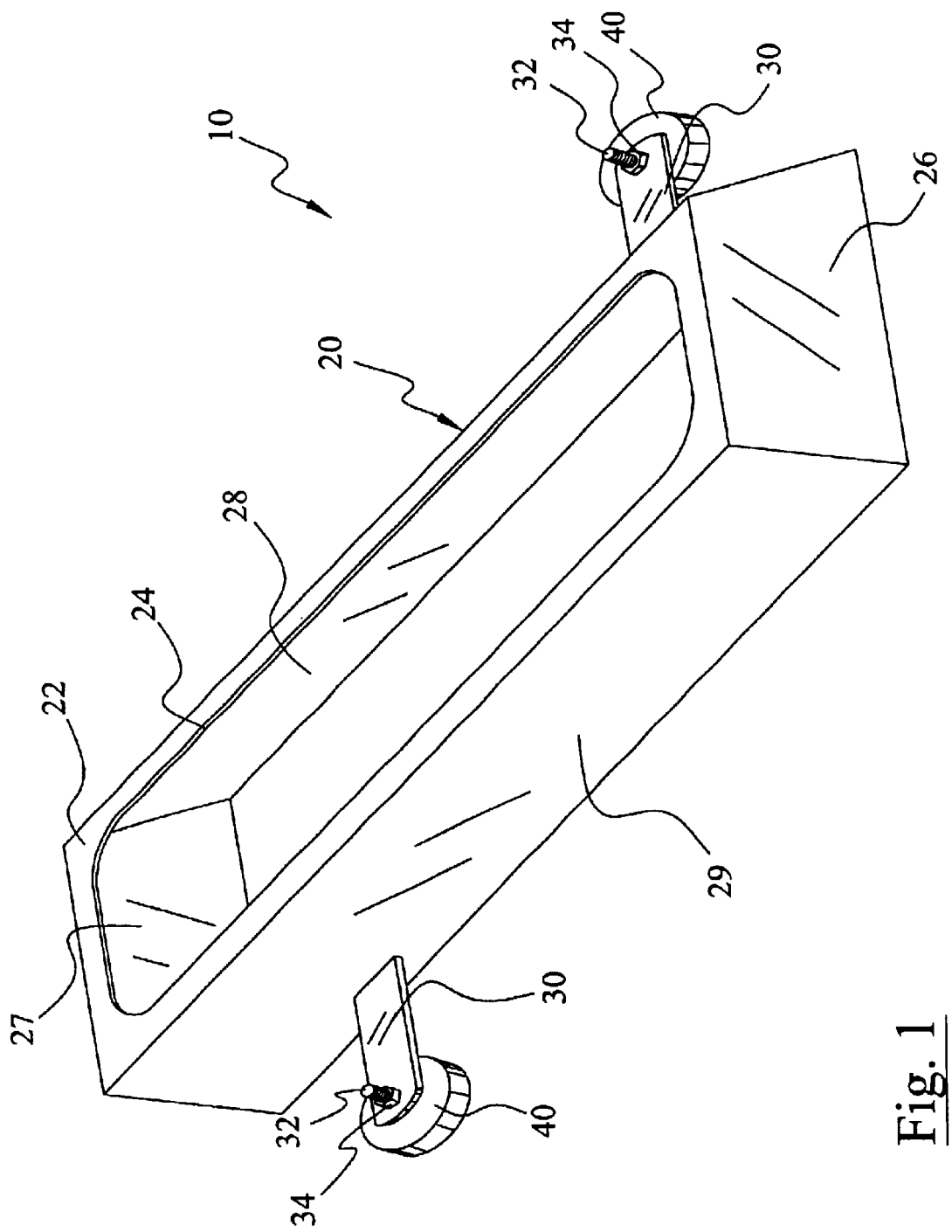
FIG. 1 is an upper perspective view of the present invention.

Turning now descriptively to the drawings, in which similar reference characters denote similar elements throughout the several views, FIGS. 1 through 5 illustrate a welding shield system 10, which comprises a main body 20 having an upper opening 24, a plurality of arm members 30 extending from the main body 20, and a securing device 40 attached to each of the arm members 30. The main body 20 is positionable over the welding area thereby deflecting air flow thereto while allowing the welding gun to be inserted through the upper opening 24.

Figure 2:
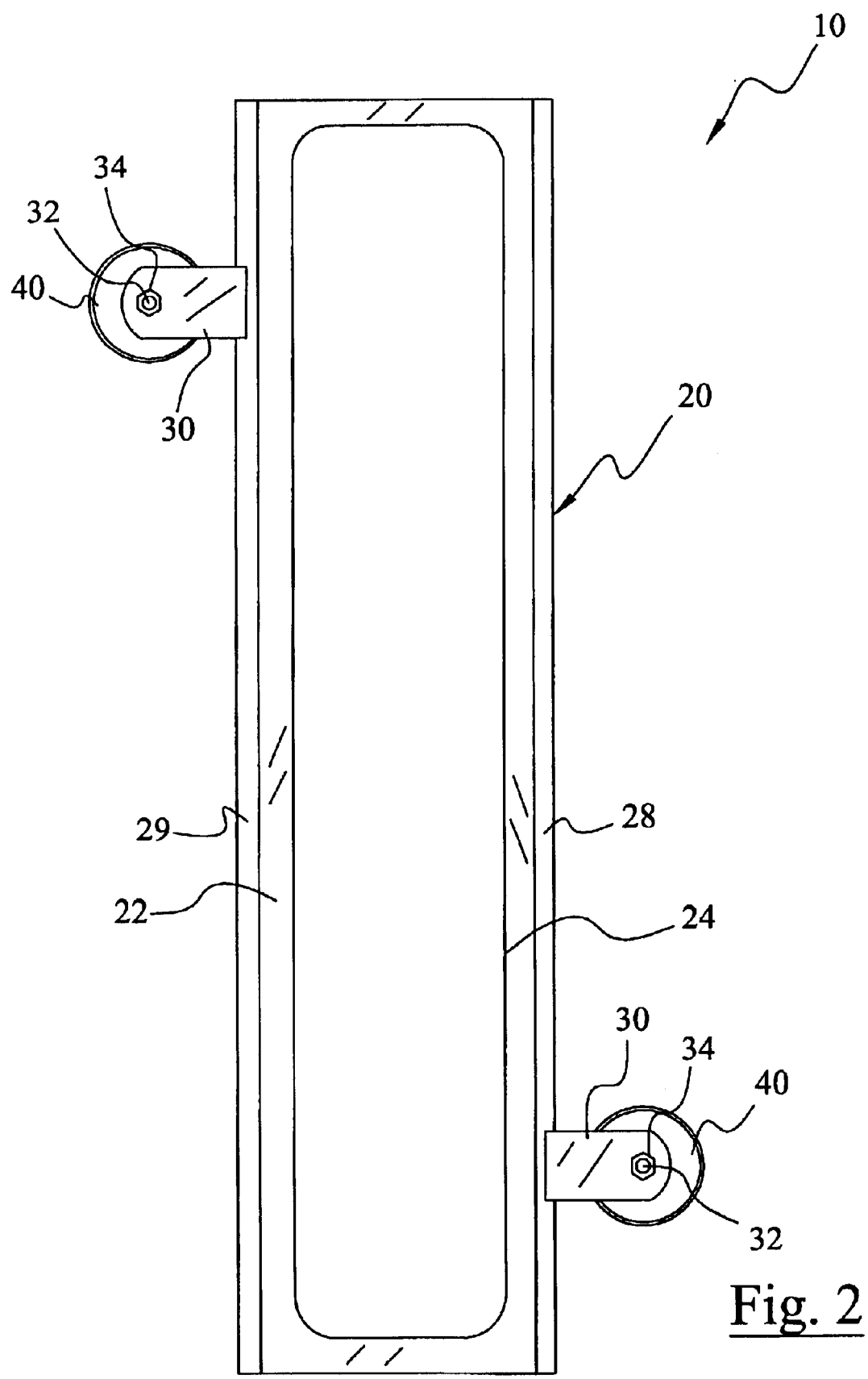
FIG. 2 is a left side view of the present invention.
Figure 3:
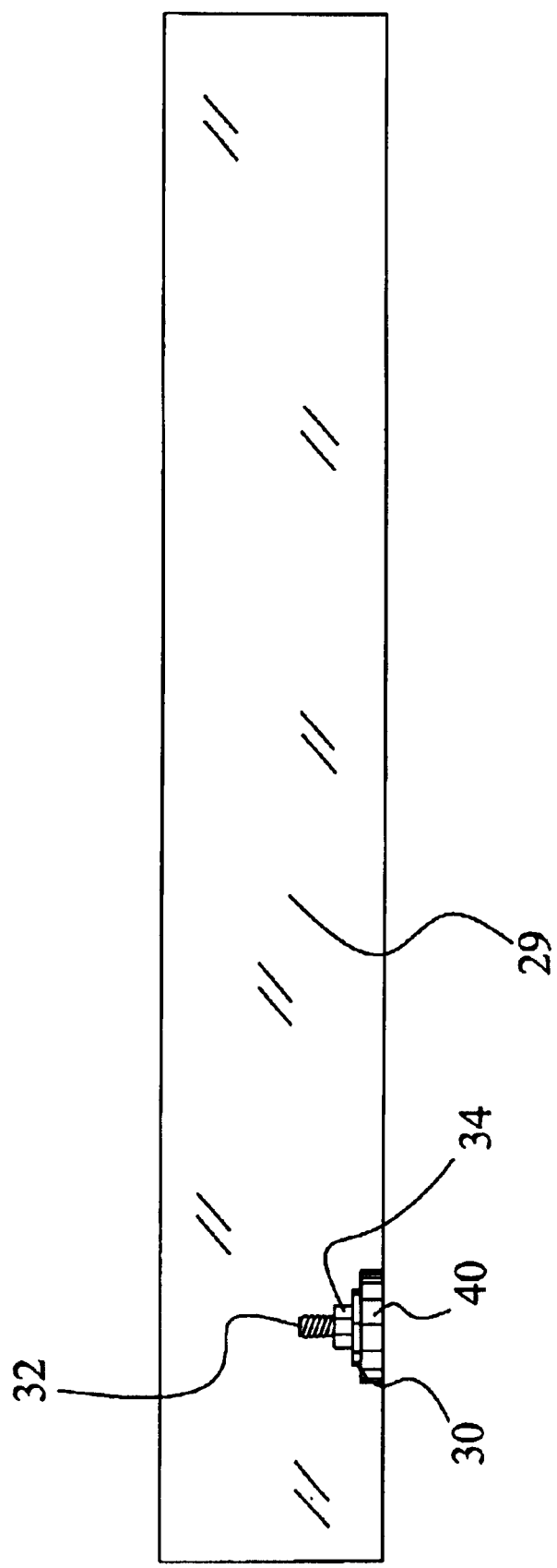
FIG. 3 is a top view of the present invention.
Figure 4:
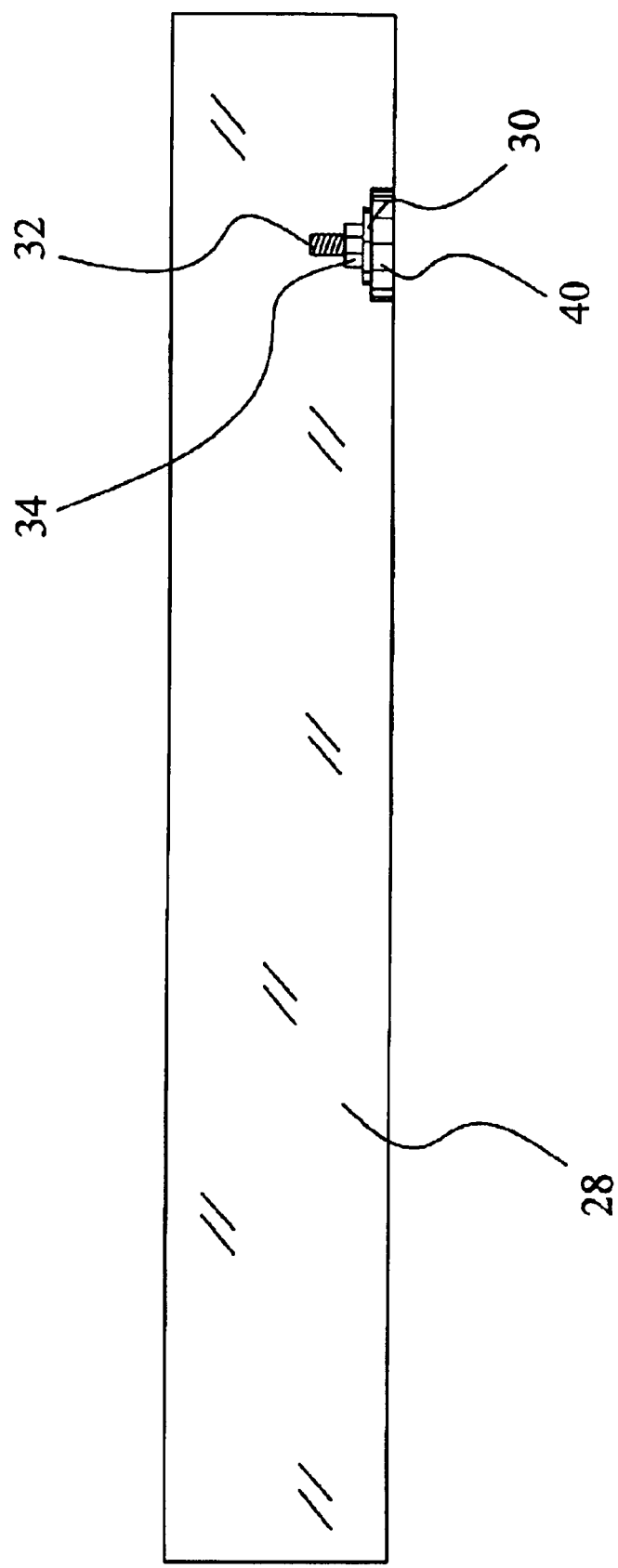
FIG. 4 is a right side view of the present invention.

As best illustrated in FIG. 1 of the drawings, the main body 20 having a hollow structure. The main body 20 has an upper portion 22, an upper opening 24 within the upper portion 22, a first end 26, a second end 27, a first side 28 and a second side 29 forming a lower opening at the lower end thereof. The main body 20 preferably is comprised of an elongate structure as best illustrated in FIG. 2 of the drawings. In addition, the upper opening 24 is preferably comprised of an elongate slot structure for allowing for welding along an elongate straight area. The main body 20 may be constructed of various materials including but not limited to metal, plastic, fiberglass, composite and the like.

Figure 5:
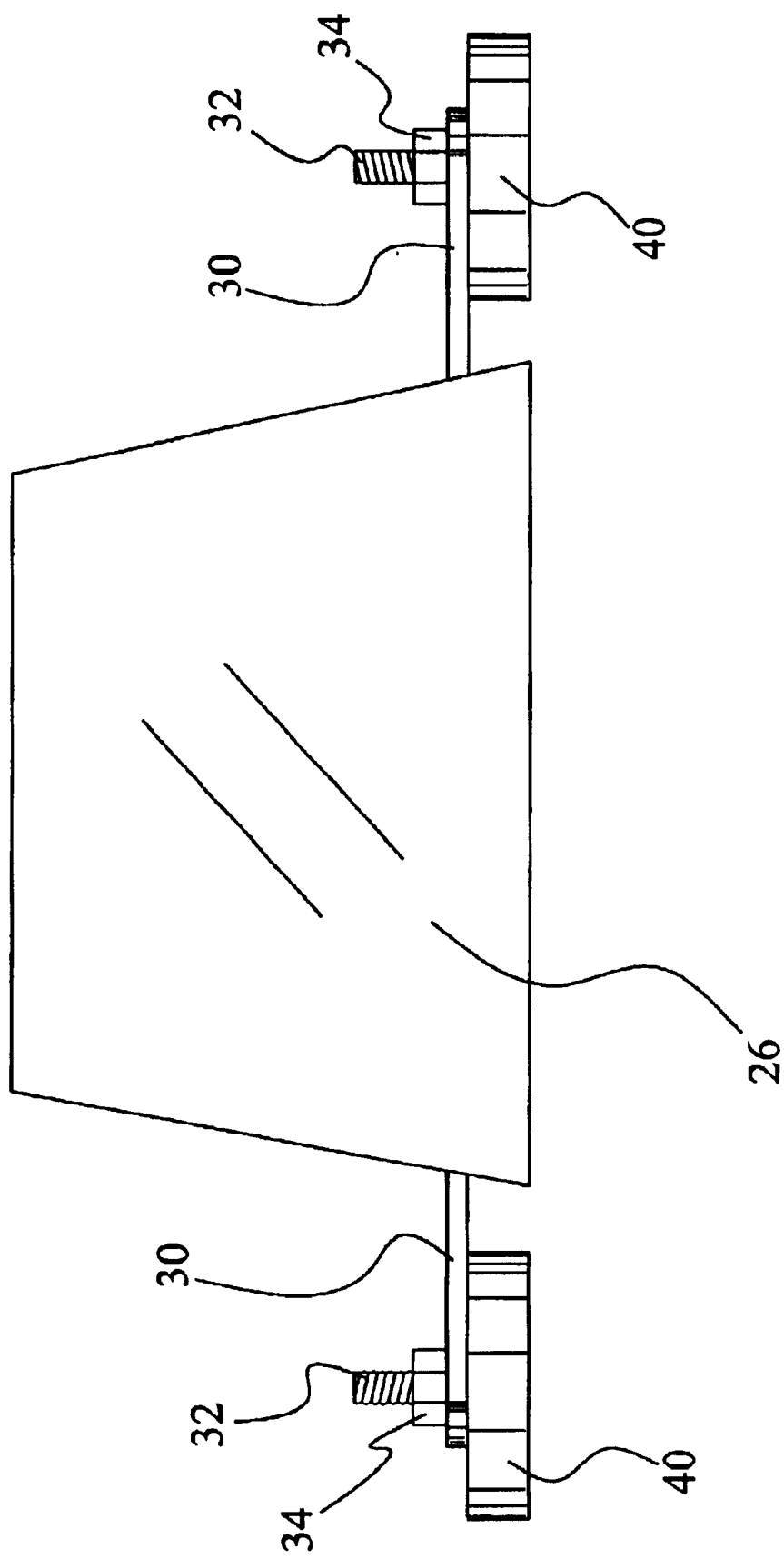
FIG. 5 is an end view of the present invention.

As best illustrated in FIGS. 1 and 5 of the drawings, the first side 28 and the second side 29 are preferably angled upwardly in a tapered manner for deflecting the air flow upwardly and over the main body 20 without entering the upper opening 24. The first end 26, the first side 28, the second end 27 and the second side 29 preferably form a solid side wall structure. The side wall structure may also be comprised of various shapes including but not limited to square, rectangular, oval and circular.

As shown in FIGS. 1, 2 and 5 of the drawings, a plurality of arm members 30 extend from a lower portion of the main body 20. The arm member 30 may have various lengths and angles with respect to the main body 20 as can be appreciated.

At least one securing device 40 is preferably attached to each arm member 30 for attaching and supporting the main body 20 upon the object to be welded. The securing device 40 may be comprised of a magnet, suction cup or similar device. FIGS. 1 and 2 illustrate the usage of two arm members 30 extending outwardly from opposing ends of the main body 20, however various other configurations may be utilized to construct the present invention.

As shown in FIGS. 1 through 5 of the drawings, a threaded member 32 is preferably attached to each securing device 40 and threadably extends through the respective arm member 30. The threaded member 32 allows for adjustment of the position of the securing device 40 to ensure that the lower end of the main body 20 is adjacent to the welding surface thereby preventing air flow beneath the main body 20 during welding. A threaded nut 34 is preferably threadably attached to the threaded member 32 for locking the position of the threaded member 32 with respect to the arm member 30.

In use, the user positions the main body 20 about the object or objects to be welded and ensures that each securing device 40 is properly attached to the surface of the object. The user may adjust the position of each threaded member 32 to obtain an air flow resistant environment surrounding the welding location. The user then is able to extend the welding gun into the main body 20 through the upper opening 24 to apply the weld in the desired location. When the user has finished with the weld, the user may simply remove the welding shield system 10 from the area and reattach to the next location to be welded.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A welding shield system for reducing air flow about a welding location, comprising:

a main body having an upper opening and a lower opening;

wherein said main body is comprised of a lower end containing said lower opening, an upper portion containing said upper opening, a first side and a second side extending downwardly from said upper portion, and a first end and a second end extending downwardly from said upper portion between said first side and said second side;

wherein said lower end is comprised of a significantly flat structure; and a plurality of support members extending from said main body, wherein each of said plurality of support members are comprised of an arm member and a securing device attached to said arm member for securing to an object, wherein said securing device is comprised of a magnet or a suction cup;

wherein each of said support members include a threaded shaft threadably attached to said arm member and secured to said securing device at a lower end thereof for adjusting a position of said securing device relative to a lower edge of said main body.

2. The welding shield system of claim 1, wherein said main body is tapered upwardly from said lower opening to said upper opening.

3. The welding shield system of claim 1, wherein said main body is comprised of an elongate structure.

4. The welding shield system of claim 3, wherein said upper opening and said lower opening are comprised of elongate slot structures.

5. The welding shield system of claim 1, wherein said first side and said second side are angled in a tapered manner narrowing toward said upper portion.

6. The welding shield system of claim 1, including a threaded nut threadably secured upon said threaded member.

7. A welding shield system for reducing air flow about a welding location, comprising:

- a main body having an upper opening and a lower opening;
- wherein said main body is comprised of a lower end containing said lower opening, an upper portion containing said upper opening, a first side and a second side extending downwardly from said upper portion, and a first end and a second end extending downwardly from said upper portion between said first side and said second side;
- wherein said lower end is comprised of a significantly flat structure; and
- a pair of support members extending from opposing ends of said main body, wherein each of said support members are comprised of an arm member and a securing device attached to said arm member for securing to an object, wherein said securing device is comprised of a magnet or a suction cup;
- wherein each of said support members include a threaded shaft threadably attached to said arm member and secured to said securing device at a lower end thereof for adjusting a position of said securing device relative to a lower edge of said main body.

8. The welding shield system of claim 7, wherein said main body is tapered upwardly from said lower opening to said upper opening.

9. The welding shield system of claim 7, wherein said main body is comprised of an elongate structure.

10. The welding shield system of claim 9, herein said upper opening and said lower opening are comprised of elongate slot structures.

11. The welding shield system of claim 7, wherein said first side and said second side are angled in a tapered manner narrowing toward said upper portion.

12. The welding shield system of claim 7, including a threaded nut threadably secured upon said threaded member.

13. A welding shield system for reducing air flow about a welding location, comprising:

- a main body having an upper opening and a lower opening, wherein said main body has an elongate structure and wherein said upper opening and said lower opening are comprised of elongate slot structures;
- wherein said main body is comprised of a lower end containing said lower opening, an upper portion containing said upper opening, a first side and a second side extending downwardly in an outwardly tapered manner from said upper portion, and a first end and a second end extending downwardly from said upper portion between said first side and said second side;
- wherein said lower end is comprised of a significantly flat structure; and
- a plurality of support members extending from said main body, wherein each of said plurality of support members are comprised of an arm member and a securing device attached to said arm member for securing to an object, wherein said securing device is comprised of a magnet or a suction cup;
- wherein each of said support members include a threaded shaft threadably attached to said arm member and secured to said securing device at a lower end thereof for adjusting a position of said securing device relative to a lower edge of said main body, and a threaded nut threadably secured upon said threaded member.

* * * * *